United States Patent [19]

Johnson

[11] Patent Number: 4,476,567
[45] Date of Patent: Oct. 9, 1984

[54] ELECTRONIC PROTRACTOR

[75] Inventor: Roger F. Johnson, Kent, Wash.

[73] Assignee: The Boeing Company, Seattle, Wash.

[21] Appl. No.: 329,771

[22] Filed: Dec. 11, 1981

[51] Int. Cl.³ .................................. G06M 3/14
[52] U.S. Cl. ................................. 377/24; 377/53; 340/347 P
[58] Field of Search ................ 377/24, 53, 19; 340/347 P; 33/1 N, 1 PT

[56] References Cited

U.S. PATENT DOCUMENTS

| | | | |
|---|---|---|---|
| 2,208,147 | 7/1940 | Eisler | 340/190 |
| 2,772,411 | 11/1956 | Cooper | 340/689 |
| 2,806,402 | 9/1957 | Ferris | 340/190 |
| 3,030,513 | 4/1962 | Bayliss et al. | 340/347 P |
| 3,041,599 | 6/1962 | Beaudette | 33/1 PT |
| 3,112,478 | 11/1963 | Ostroff | 340/347 P |
| 3,541,572 | 11/1970 | Shults | 33/1 T |
| 3,557,458 | 1/1971 | Shults | 33/1 T |
| 3,793,731 | 2/1974 | Hyyppa et al. | 33/1 PT |
| 3,859,651 | 1/1975 | Thomas, Jr. | 340/689 |
| 3,996,670 | 12/1976 | Joyal et al. | 33/1 PT |
| 4,101,882 | 7/1978 | Kramer | 340/347 P |
| 4,168,123 | 9/1979 | Price | 356/150 |
| 4,213,035 | 7/1980 | Washizuka et al. | 377/24 |

FOREIGN PATENT DOCUMENTS 158292  2/1979  Netherlands ................ 33/1 N

Primary Examiner—Douglas W. Olms
Assistant Examiner—Frank M. Scutch, III
Attorney, Agent, or Firm—Christensen, O'Connor, Johnson & Kindness

[57] ABSTRACT

Angular deviations of a control surface cause phase quadrature output signals to be produced from an optical encoder mounted thereon. Successive values of the quadrature signals are latched to logic circuitry which determines the state and direction of rotation, causing a counter to up or down count, appropriately. A digital display, responding to the status of the counter, indicates the magnitude and direction of the angular deviation of the control surface.

8 Claims, 7 Drawing Figures

| ADDRESS | DATA | ADDRESS | DATA | ADDRESS | DATA | ADDRESS | DATA |
|---------|------|---------|------|---------|------|---------|------|
| 00 | 2 | 10 | 2 | 20 | 2 | 30 | 6 |
| 01 | 1 | 11 | 1 | 21 | 1 | 31 | 4 |
| 02 | 5 | 12 | 0 | 22 | 5 | 32 | 5 |
| 03 | 2 | 13 | 2 | 23 | 2 | 33 | 6 |
| 04 | 5 | 14 | 0 | 24 | 5 | 34 | 6 |
| 05 | 2 | 15 | 2 | 25 | 2 | 35 | 5 |
| 06 | 2 | 16 | 2 | 26 | 2 | 36 | 6 |
| 07 | 1 | 17 | 1 | 27 | 1 | 37 | 6 |
| 08 | 1 | 18 | 1 | 28 | 1 | 38 | 4 |
| 09 | 2 | 19 | 2 | 29 | 2 | 39 | 4 |
| 0A | 2 | 1A | 2 | 2A | 2 | 3A | 6 |
| 0B | 5 | 1B | 0 | 2B | 5 | 3B | 6 |
| 0C | 2 | 1C | 2 | 2C | 2 | 3C | 5 |
| 0D | 5 | 1D | 0 | 2D | 5 | 3D | 6 |
| 0E | 1 | 1E | 1 | 2E | 1 | 3E | 4 |
| 0F | 2 | 1F | 2 | 2F | 2 | 3F | 6 |

Fig. 7

ELECTRONIC PROTRACTOR

BACKGROUND OF THE INVENTION

The present invention relates to the angular deviation measurement art and, more particularly, to an electronic protractor.

In many applications, the need exists for a lightweight, highly accurate protractor. An excellent example of this need is found in the commercial aircraft industry. There, the precise angle of horizontal control surfaces must be measured to insure proper response of the aircraft's hydraulic actuating systems to commands from the flight director computer.

The prior art technique for measuring aircraft control surface rotation involves affixing on the airplane a large, heavy aluminum protractor. This protractor clamps to the non-rotating aircraft surface, with the rotating surface carrying a cursor pointing to the graduations engraved on the protractor body.

This technique suffers from numerous problems. First, it is a two-person operation. One person rotates the controls from the cockpit and the other observes the cursor position at the protractor. Second, the cost of such protractors is high, due to both the nature and quantity of materials involved and the requisite labor. Further, installation is awkward since a crane must be used to install the protractor on the aircraft due to the high protractor weight. This results in the possibility of damage to the aircraft skin if the protractor is improperly lowered into place. In addition, the zero reference plane of the protractor is subject to move due to its great weight on the aircraft control surface.

Efforts have been made in the angle measuring art at developing electronic protractors. However, none of the available designs has proven suitable in applications such as described above in the aircraft industry. A principal problem with prior designs is that they are highly subject to error due to vibration. In addition, whereas such prior electronic protractors are capable of measuring relatively large angles with precision, deficiencies in their design have rendered them incapable of accurately resolving small deflections.

SUMMARY OF THE INVENTION

It is an object of this invention, therefore, to provide a lightweight, electronic protractor which exhibits high noise immunity and is capable of high accuracy small angle deflection measurements.

Briefly, according to the invention, the apparatus for measuring the angular deflection of a surface from a reference position includes an encoding means which produces a pair of phase quadrature signals representative of angular deflections of the surface from the reference position. Processing circuitry processes the pair of phase quadrature signals and produces an output signal representative of the angular deviation and direction of rotation of the surface from the reference position. The processing circuitry includes a clock for producing a clock signal, a signal storage means for storing the value of each of the quadrature signals at successive clock signals, and logic circuitry which compares the present quadrature signal with the stored quadrature signal and predeterminedly determines the direction or absence of surface rotation in response thereto. A display converts the processing circuitry produced signals to a visual display of the angular deviation of the surface.

BRIEF DESCRIPTION OF THE DRAWINGS

FIG. 7 is a truth table illustrating the programming of the logic circuitry used for processing optical encoder input data.

DETAILED DESCRIPTION OF THE PREFERRED EMBODIMENT OF THE INVENTION

Figure 1:
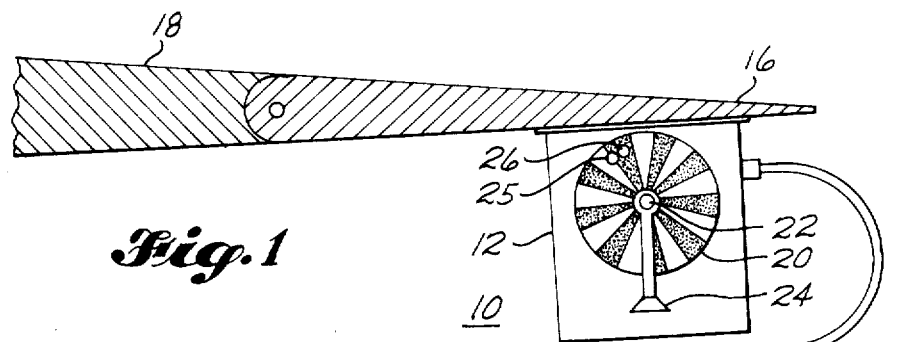
FIG. 1 illustrates a control surface of an aircraft having mounted thereon an optical encoder which is connected to electronic processing circuitry.

FIG. 1 illustrates an electronic protractor, indicated generally at 10, including an optical encoder 12 and processing and display circuitry 14. As shown, the optical encoder is mounted to a rotatable aircraft control surface 16, such as a flap, which rotates with respect to the aircraft wing structure 18.

Figure 2:
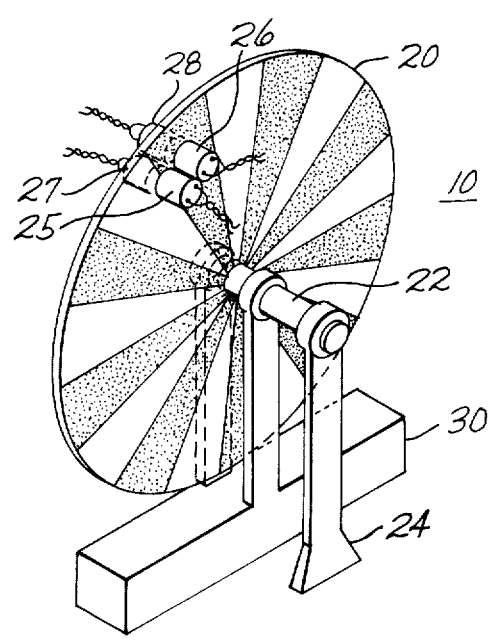
FIG. 2 illustrates the principal components of a typical optical encoder.

The optical encoder, which is described more thoroughly with respect to FIG. 2, includes a rotating disk 20 mounted on a shaft 22 to which is affixed a pendulum 24. A pair of sensors 25, 26 are positioned opposite alternating radial opaque and transparent bands on the disk 20. The sensors 25, 26 are positioned one-quarter cycle of pitch apart, i.e. in phase quadrature.

When the optical encoder 12 is mounted to the control surface 16, the surface is moved to a reference position from which measurements are made. Once in position representing zero degrees of angular deviation relative to a reference surface, as determined by a straightedge or angle template held against the two surfaces, a reset button 28 on the processing and display unit 14 is depressed, whereby the digital readout of the system is set at 000.0°. Now, as the control surface 16 is commanded to move to various angles, as possibly dictated by the aircraft's flight director computer, the pendulum 24, working on a gravity reference, causes a relative rotation of the disk 20 with respect to the sensors 25, 26. Thus, the sensors produce output signals which are processed by the circuitry contained within unit 14 which produces an appropriate readout on its digital display.

Optical encoder 12 is lightweight in construction such that it may be easily affixed to the aircraft control surface 16 by a single operator. In addition, the digital readout may be located such that the operator in the cockpit can easily view the control surface angular deviations. Further, the total cost of the optical encoder 12 and processing and display unit 14 are modest. All of these factors are seen to be distinct improvements over the prior method of measuring aircraft control surface angular deviations as discussed above.

FIG. 2 illustrates the construction of the optical encoder 12, as shown in FIG. 1. As discussed with respect to FIG. 1, the encoder 10 is comprised of a disk 20 having alternating opaque and transparent radial equal area bands. The disk is affixed to a shaft 22 which is rotatable with respect to the superstructure 30 of the encoder housing, indicated at 30.

Also in fixed position relative to the superstructure 30 are a pair of optical sensors 25, 26. Opposite the optical sensors are light sources 27, 28, respectively. The sensors 25, 26 and light sources 27, 28 are mounted in a 90° relationship with respect to the bands, as shown.

In operation, as the surface to which the optical encoder superstructure 30 is rotated, the pendulum 24, which tends to point to the center of the earth, causes a rotation of the disk 20 with respect to the sensors 25, 26. Due to the opaque and transparent bands passing between the sensors 25, 26 and their opposite light sources 27, 28, the sensors produce a pair of phase quadrature signals which are used to determine the direction, and magnitude of the rotation, as is described more fully with respect to FIG. 3.

In this, the preferred embodiment of the invention, an encoder disk having 900 bands was used which conveniently provides, via the instrumentation discussed below, a reading in degrees with an accuracy of 0.1°.

Figure 3:
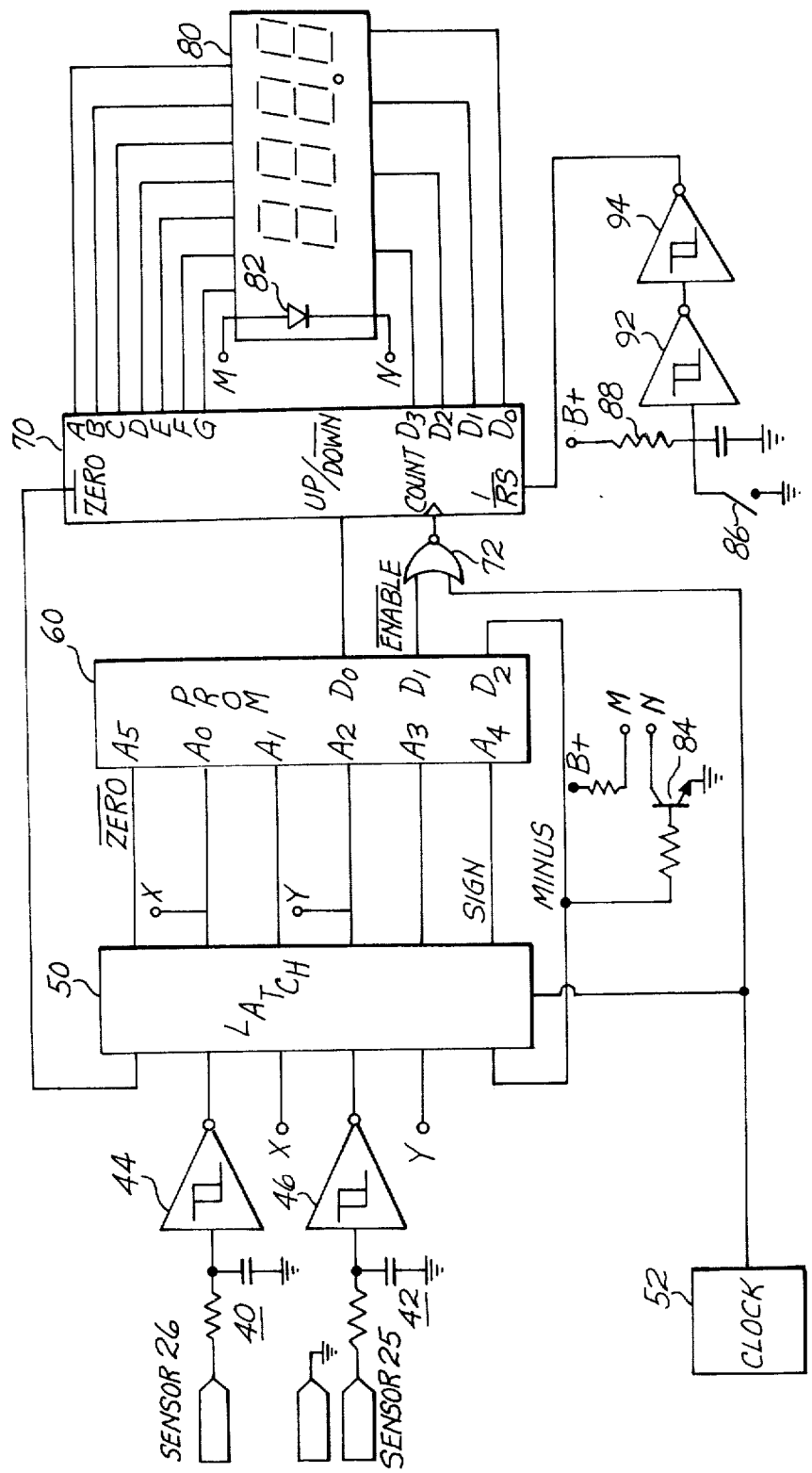
FIG. 3 is a detailed schematic diagram of the processing and display circuitry.

FIG. 3 is a detailed schematic diagram of the processing and display circuitry 14 of FIG. 1. Here, the phase quadrature signals produced by sensors 25, 26 are low pass filtered by conventional R/C circuits 40, 42 and passed through conventional Schmitt circuits 44, 46. The filters 40, 42 and Schmitt triggers 44, 46 are used to eliminate most phase jitter noise from the sensor signals.

The sensor signals are then passed to two inputs of a hex latch 50. Hex latch 50 is of conventional design, having a plurality of internal D flip flops which pass logic levels at the input to a corresponding output at a rate determined by a clock signal, here supplied by clock 52. As will be understood more fully with respect to the discussion hereinbelow, a particular design feature of the invention is that it analyzes both present and past values of the clock signal to make a determination as to the direction and state of rotation of the optical sensor. Thus, as shown, an additional input to latch 50 is the sensor 25 signal X which has already passed through one input of latch 50. The same is true for the latched output Y of the sensor 26 signal. The remaining two inputs to latch 50 are a zero signal and a minus sign feedback signal, both of which are discussed more fully hereafter.

The six output lines from the latch 50 are routed to six input addresses of a programmable read only memory (PROM) 60. While the precise programming of PROM 60 is described more completely with respect to FIGS. 6 and 7, PROM 60 responds to the various signals at its input addresses $A_0$–$A_5$ to produce predetermined logic levels at its outputs $D_0$–$D_2$.

The $D_0$ output from PROM 60 is coupled to the up/down input of a counter 70. The $D_1$ output from PROM 60 is an enable signal which is one of two inputs to a NOR gate 72, the remaining input being the output from clock 52. NOR gate 72 passes clock signals to the count input of counter 70 in response to an enable signal being provided by the PROM 60. Thus, counter 70 operates in the normal manner to either increment or decrement its count, based on the $D_0$ output from PROM 60, for clock signal transitions at the count input as determined by an enable signal from PROM 60. PROM 60, in accordance with its internal programming, causes counter 70 to up or down count the clock signal during intervals when the clock is passed through NOR gate 72 as determined by the PROM enable output.

Included within counter 70 is multiplex display driver circuitry. Thus, the count within counter 70 is displayed on a conventional multiplexed LED digital display 80. A particular number to be displayed is determined by counter outputs A through G and the particular one of four digits to be displayed is determined by counter outputs $D_0$–$D_3$. Further, digital display 80 is provided with a minus sign which is lighted by an LED 82. Current through LED 82 is determined by a transistor 84 which is, in turn, controlled by the $D_2$ output from PROM 60. Thus, the logic within PROM 60 activates the minus sign in the display 80 (indicative of a negative angle of rotation of the optical encoder) in accordance with the PROM internal programming.

As is discussed with respect to FIG. 1, the counter display may be reset to a reading of 0000 by activating a normally open reset switch 86 which discharges a capacitor 90. The resulting voltage across capacitor 90, as shaped by series Schmitt triggers 92, 94, is applied to the reset input of counter 70, thereby resetting the count state to zero. Resistor 88 and capacitor 90 form a power up circuit reset, activating the counter to a known state.

Figure 4:
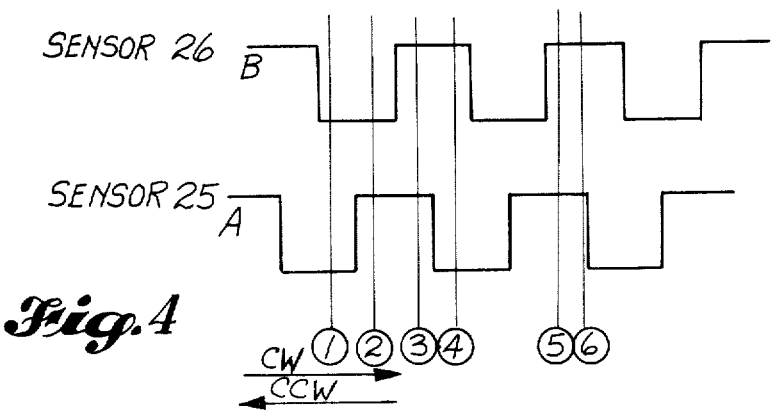
FIG. 4 shows representative waveforms of the quadrature outputs from the optical encoder sensors.
Figure 6:
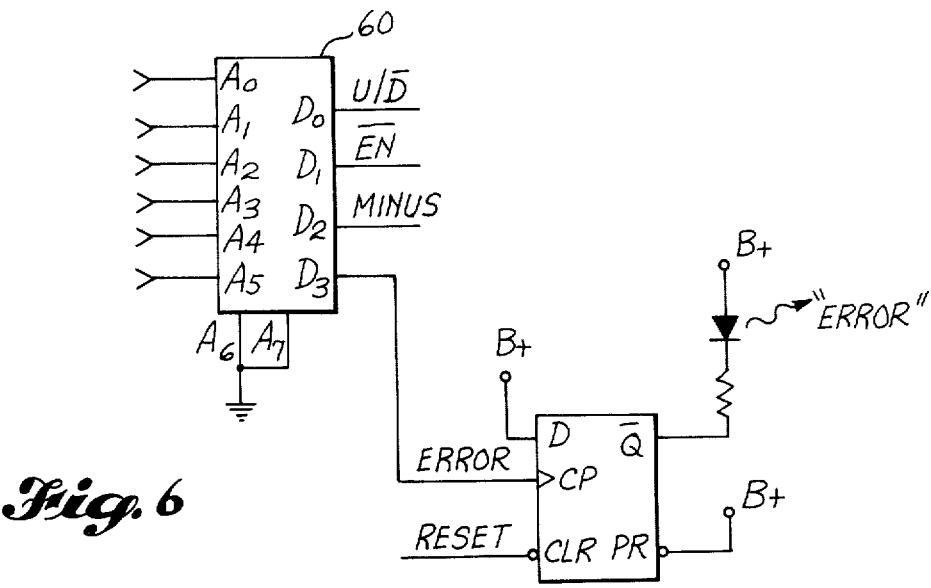
FIG. 6 is a schematic diagram showing illegal state detection circuitry.

That portion of the programming of PROM 60 which determines whether or not the optical encoder is rotating (thus eliminating a noise input from producing a false reading) and which determines the direction in which the encoder is rotating may be understood with respect to FIGS. 4 and 6.

FIG. 4 illustrates representative waveforms from the sensors 25, 26 for clockwise and counterclockwise rotation of the optical encoder. Clockwise rotation is depicted as going from state 1 to state 2 or state 2 to state 3 with the other combinations obvious from the figure. Likewise, counterclockwise rotation is depicted as going from state 4 to state 3 and so forth.

Figure 5:
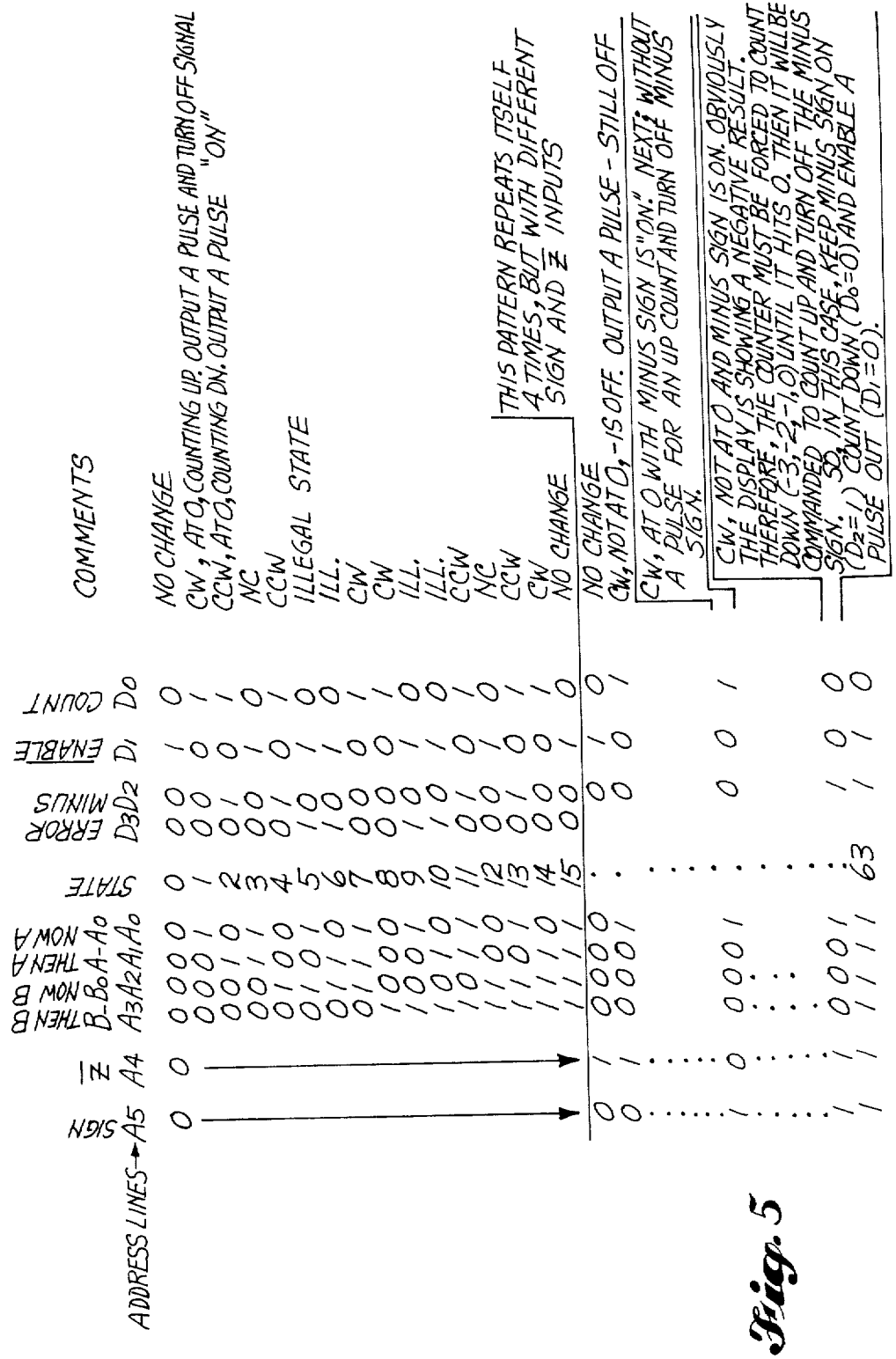
FIG. 5 is a table illustrating sample inputs and outputs to the logic control circuitry.

FIG. 5 is a truth table illustrating the logic by which the state and direction of rotation of the optical encoder is determined. As will be recalled from FIG. 3, through the use of the latch 50 the PROM simultaneously looks at present and immediately preceding values of the encoder signal level. This is represented in FIG. 5 by the headings "NOW" and "THEN". The headings of the columns represent the four lowest address bits to PROM 60 of FIG. 3. As is seen in FIG. 5, by comparing previous and existing values of the two sensor signals, the direction of rotation may be determined. This truth table represents four of the six inputs to the PROM, the other two being $\overline{\text{ZERO}}$ and SIGN. Hence, this portion of the PROM represents the sixteen possible values the A and B past and present data can represent. There are four clockwise transitions, four counterclockwise transitions, four combinations of "no change" and four illegal conditions. The illegal states would be generated when going from state 1 to state 3, or in general any skipping of states. This would happen if the encoder were generating pulses faster than the clock frequency. Though the clock frequency is set to be roughly 10 times the highest expected frequency from the encoder, a rapid movement or acceleration could generate an illegal state. A way to identify illegal states is discussed hereafter.

In addition, and perhaps more importantly, by comparing NOW and THEN values of the sensor signals the logic may determine whether or not the encoder is, in fact, rotating. FIG. 5 indicates states which are representative of non-rotation. Prior attempts at developing electronic protractors have resulted in units which are extremely vibration sensitive and which are incapable of high resolution at low angular deviations. The present system, however, overcomes these deficiencies by looking at prior and existing states of the encoder and, via suitable logic processing, making a determination as to whether or not noise signals are being generated or the encoder is, in fact, rotating.

FIG. 5 gives a sample of the 6 input lines and the associated outputs. The $\overline{ZERO}$ line is output from the counter when the counter is at 0000. The SIGN line is a delayed twin of the MINUS line and is used to light up the minus bar when needed. An example of PROM coding is state #1 as shown in FIG. 5. The lower four bits indicate a clockwise rotation. $\overline{Z}=0$ indicates the counter is at 0000 and SIGN$=0$ means the minus sign is off. Therefore, on the next clock pulse an output pulse is sent to the counter ($D_1=0$). This is an "up" pulse ($D_0=1=$UP) and the minus sign is off ($D_2=0$).

The four illegal states are an indication that the encoder is rotating too fast for the clock frequency. If this happens, no "up" or "down" pulses are output and an error in counting occurs.

A technique for flagging the error is understood as follows. The $D_3$ output of the PROM is used to code the 16 illegal states out of 64 possible states. This is indicated in the first 16 entries in FIG. 5, with the states 16 through 63 having the same illegal codes as copied from the first group of 16 states. That bit is used to set a flip-flop which flags an error. The reset button then clears the flip-flop and turns off the error light. The error detection circuitry is depicted in FIG. 6.

FIG. 7 is the overall truth table for the PROM 60 as shown in FIG. 3. Here, the address and data outputs are in hexadecimal form. It will be understood that the overall truth table of FIG. 7 is derived in substantial part from the table of FIG. 5 as well as the other described functions provided by the processing circuitry.

In summary, a lightweight, electronic protractor has been described which exhibits high noise immunity yet has excellent resolution at low angles of deflection.

While the preferred embodiment of the invention has been described in detail, it should be apparent that many modifications and variations thereto are possible, all of which fall within the true spirit and scope of the invention.

I claim:

1. Apparatus for measuring the angular deflection of a surface from a reference position comprising:
   encoding means for producing a pair of phase quadrature signals representative of angular deflections of the surface from the reference position;
   processing means for processing said pair of phase quadrature signals and producing output signals representative of the angular deviation and direction of rotation of the surface from said reference position,
said processing means including:
   clock means for producing a clock signal;
   signal storage means for storing the value of each of said quadrature signals at successive clock signals;
   logic means for comparing present quadrature signal values with stored quadrature signal values and predeterminedly determining the state and direction of surface rotation in response thereto; and
   display means for converting said processing means produced signals to a display of the angular deviation of the surface.

2. The apparatus of claim 1 wherein the encoding means comprises:
   an optical encoder including a disk having alternating transparent and opaque radial bands, the disk being mounted on a rotatable shaft, a light source on one side of the disk and a pair of light responsive sensors positioned in a 90° phase relationship to the bands on the opposite side of the disk, and a pendulum affixed to said shaft,
   the optical encoder adapted to be secured to said surface such that an angular deflection of the surface causes a rotation of the disk and shaft relative to the sensors whereby the sensors produce said pair of phase quadrature signals.

3. The apparatus of either of claims 1 or 2 wherein the storage means comprises an electronic storage register, the storage register entering data, including the phase quadrature signals, at the clock rate and providing the inputted data at output terminals delayed by a predetermined number of clock transitions, the register having feedback connections from predetermined output to input terminals such that the register simultaneously provides at its output terminals the values of the phase quadrature signals at successive clock transitions.

4. The apparatus of either of claims 1 or 2 wherein the logic means further comprises:
   a programmable read only memory (PROM), the PROM being programmed such that predetermined successive values of the quadrature signals at the input to the PROM cause:
      (a) a PROM direction output to go high in response to one direction of rotation of the disk and to go low in response to the opposite direction of disk rotation, and
      (b) a PROM enable output to be activated only if the condition of the input signals reflects a rotation of the disk;
   counter means having an up/down input and a count input, the counter responding to signal transitions at its count input to increment or decrement its count responsive to the signal at its up/down input;
   means for coupling the PROM direction output to the up/down input of the counter; and
   gating means for passing clock signals to the count input of the counter only so long as the PROM enable output is activated.

5. The apparatus of claim 3 wherein the logic means further comprises:
   a programmable read only memory (PROM), the PROM being programmed such that predetermined successive values of the quadrature signals at the input to the PROM cause:
      (a) a PROM direction output to go high in response to one direction of rotation of the disk and to go low in response to the opposite direction of disk rotation, and
      (b) a PROM enable output to be activated only if the condition of the input signals reflects a rotation of the disk;
   counter means having an up/down input and a count input, the counter responding to signal transitions at its count input to increment or decrement its count responsive to the signal at its up/down input;
   means for coupling the PROM direction output to the up/down input of the counter; and
   gating means for passing clock signals to the count input of the counter only so long as the PROM enable output is activated.

6. The apparatus of claim 4 wherein the display means includes a digital display for indicating the present count of the counter and the direction of angular deviation.

7. The apparatus of claim 5 wherein the display means includes a digital display for indicating the present count of the counter and the direction of angular deviation.

8. The apparatus of claim 1 further including error detection circuitry for monitoring the status of the processing means and indicating an illegal condition on said display means in response to a predetermined condition therof.

* * * * *